Figure 1:
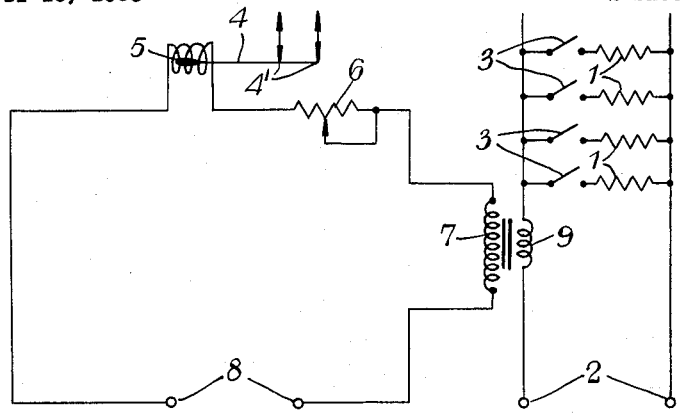

April 3, 1962  A. E. BENNETT  3,028,471
TEMPERATURE CONTROL FOR A COMPARTMENTAL VEHICLE
Filed April 15, 1958  2 Sheets-Sheet 1

Inventor
Albert Edwin Bennett
by Sommers + Young
Attorneys

April 3, 1962 A. E. BENNETT 3,028,471
TEMPERATURE CONTROL FOR A COMPARTMENTAL VEHICLE
Filed April 15, 1958 2 Sheets-Sheet 2

Inventor
Albert Edwin Bennett
by Sommers & Young
Attorneys

United States Patent Office

3,028,471
Patented Apr. 3, 1962

3,028,471
TEMPERATURE CONTROL FOR A COMPARTMENTAL VEHICLE
Albert Edwin Bennett, 42 Elm Park Road, South Norwood, London, England
Filed Apr. 15, 1958, Ser. No. 728,710
Claims priority, application Great Britain Apr. 15, 1957
7 Claims. (Cl. 219—20)

This invention concerns improvements relating to the control of the temperature in compartments of a vehicle, especially a railway coach or aircraft divided into separate compartments.

In a railway coach in which the compartments are supplied with air from a common air-conditioning or heating equipment, the temperature in all the compartments is generally maintained at the same value, which depends upon the setting of a common temperature-control thermostat. This arrangement is not wholly satisfactory, as the occupants of the individual compartments may prefer different temperatures.

To satisfy such individual preferences, heaters may be provided in the compartments, or in individual ducts or air-discharge devices communicating therewith, and may be arranged to be controlled independently by switches in the respective compartments. However, heat provided by such heaters is carried back by the return air to the air-conditioning equipment past the main temperature-control thermostat or thermostats. As the control exercised by the latter still causes the air-conditioning or heating equipment to keep the air at a temperature appropriate for maintaining the mean temperature of the whole coach at the same value, it follows that the switching on of individual-heaters for one or more compartments results in lowering the temperature in the other compartments. The present invention seeks to obviate this drawback.

For this purpose, according to the invention, a heating system for a compartmental vehicle comprises a common equipment connected to the compartments of the vehicle for supplying air thereto, the said equipment including means for changing the temperature of the said air, a common air return between the said compartments and the said equipment, individual electrical heaters for respective compartments, a current-supply circuit for the said heaters, separately controllable switches for connecting respective compartment heaters to the said circuit and an arrangement for controlling the temperature in the said compartments comprising in combination with a main thermostat arranged to be influenced by the temperature of the air in the said common return and operatively connected to the said equipment for controlling the temperature-changing action thereof, so that the temperature is increased on a decrease of temperature of the air in the said common return below a predetermined temperature setting of the said main thermostat, and current-responsive means connected to the said circuit and operatively associated with the said main thermostat for automatically controlling its effective setting, the said setting being raised in dependence upon the current in the said circuit when the said heaters are energized upon closure of the said switches.

With a main thermostat of the well-known heater-bias type, the invention may be carried into effect by causing the bias applied to be varied in dependence upon the total current supplied for individual compartment heating. This can be achieved by varying the voltage, normally constant, or the wattage with which a bias heater on the thermostat is supplied.

Figure 2:
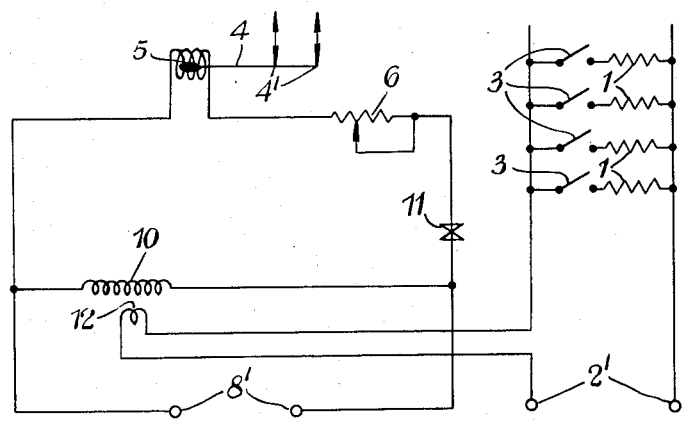
Figure 3:
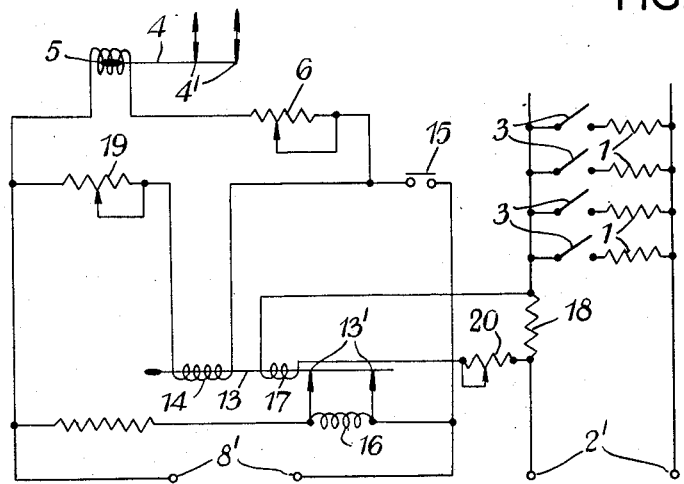
Figure 4:
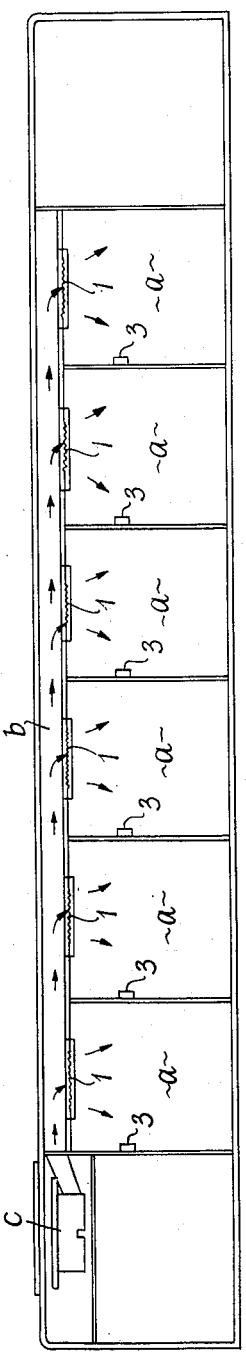
Figure 5:
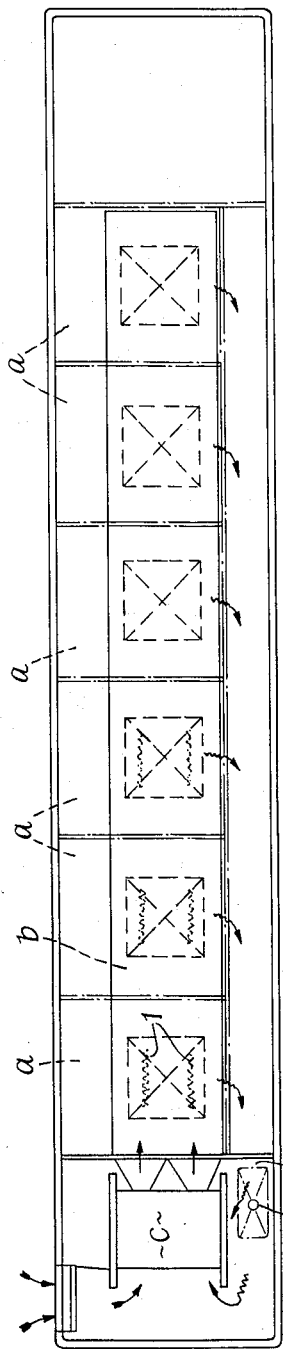

Ways of carrying the invention into effect will now be more fully described by way of example and with reference to the accompanying drawings, in which:

FIGURE 1 is a circuit diagram for an arrangement using an alternating-current supply, FIGURE 2 a diagram for an arrangement using a direct current supply, FIGURE 3 a diagram embodying a so-called wattage regulator, and FIGURES 4 and 5 are a diagrammatic vertical section and plan view of a compartmental railway coach.

In FIGURE 1, heaters 1 in the individual compartments *a* (FIGURES 4 and 5) of a railway coach or in the individual air-intakes, from a main air-supply duct *b* to such compartments are connected to a supply 2 of alternating current and can be switched on and off at will by switches 3 in respective compartments. If desired, the heaters may be in sections so that the amount of the so-called reheat can be controlled by means of a multi-position switch.

The operation of air-conditioning equipment *c* (FIGURES 4 and 5) common to the whole coach is controlled in per se known manner by a common, main, temperature-control thermostat, indicated purely diagrammatically at 4, which is exposed in a return duct *d* to the temperature of the air returning to the said equipment *c* from all of the compartments. This thermostat determines, or assists in determining, the amount by which the air delivered to the coach through duct *b* by the equipment *c* is heated or cooled. The thermostat illustrated is of the mercury-in-glass type having contacts 4', connected to the control circuit of the air-conditioning equipment, and a bias heater 5. The heater 5 is connected through an adjustable resistance 6 and the secondary 7 of a current transformer across a supply 8 of alternating current at constant voltage. The primary 9 of the transformer is connected in series with the supply to the compartment heaters 1. The voltage induced in the winding 7 by the total current supplied to the heaters 1 is arranged to be in phase opposition and subtractive with respect to the voltage applied by the source 8 to the bias heater 5. Consequently, as compartment heaters 1 are switched on, the bias heat applied to the thermostat 4 will be progressively reduced and the effective setting of the thermostat progressively raised, so that the temperature of the air returned past the thermostat will be correspondingly increased, as is required.

In FIGURE 2, the heater supply at 2' and the constant-voltage supply at 8' are direct current. With such direct-current supplies, the required variation in the bias-supply voltage may be produced by means of a regulator, for example an electro-magnetic vibratory type of regulator. The regulator illustrated comprises a shunt winding 10 and vibratory contacts 11. For the present purpose, it is also provided with an additional, series, winding 12 carrying the current or a proportion of the current supplied to the compartment heaters 1, the effects of the windings 10 and 12 being arranged to be additive. Consequently, the regulated voltage supplied to the heater 5 of the main thermostat 4 will again be reduced with increasing current supplied to the compartment heaters 1. This regulation may alternatively be provided for by modifying an existing regulator of the equipment. By its normal regulating action at the virbatory contacts 11 under the influence of the shunt winding 10 alone, the electromagnetic regulator would tend to maintain the voltage across the heater 5, and therefore the current in the said heater, constant. The thermostat 4 is thus given a certain bias heat and temperature setting, as is well understood in the art. If heaters 1 are switched on, current will flow in the regulator series winding 12. As this is additive in relation to the winding 10, the regulator will reduce the constant voltage across, and the current in, the heater 5. The bias heat supplied to the thermostat 4 will be reduced and the effective setting of the thermostat 4 will be reduced and the effective setting of the thermostat raised, just as in FIG. 1, the ultimate result being thus also the same.

In the arrangement illustrated in FIGURE 3, use is made of a so-called wattage regulator 13 for controlling the bias winding 5 of the main thermostat 4. The regulator 13 is of a known mercury-in-glass, type, similar to a thermometer, having contacts 13' and a bias heater 14 connected through relay contacts 15 across the direct-current supply 8'. The contacts 13', which are arranged to be closed at a temperature well above the maximum ambient temperature, are connected in parallel with the winding 16 of the relay across the supply 8'. The relay is designed to hold the contacts 15 closed when the winding 16 is energised. It will be appreciated that if the contacts 15 are closed, current will be supplied to the heater 14 and, due to the heat developed, the contacts 13' will become closed. Due to the resultant de-energisation of the winding 16, the contacts 15 will open and the heater will be disconnected from the supply. The contacts 13' will therefore open, the relay winding 16 be re-energised and the contacts 15 closed, so that the contacts 13' will also be closed after an interval dependent on the bias heat applied to the regulator. The cycle described will thus be constantly repeated. The effect of the cyclic action is that a constant wattage is supplied to the bias heater 5 of the main thermostat 4.

For the purpose of the present invention, the wattage regulator is provided with an additional bias heater 17 carrying a proportional part, derived by a diverter resistance 18, of the current supplied to the compartment heaters 1. As the wattage regulator is influenced solely by the heating effects of the heaters 14 and 17, these effects are additive. Consequently, the regulated wattage supplied to the heater 5 of the main thermostat 4 will be reduced with increasing current supplied to the compartment heaters 1 and the effective setting of the thermostat 4 will, as in the previous examples, be progressively raised. Disregarding the additional bias heater 17, the so-called wattage regulator 13, 14, 13' and relay 15, 16 would have the same effect essentially as the regulator 10, 11 in FIG. 2. Assume that initially, the contacts 13' are unbridged by the mercury in the device 13. The relay winding 16 is energized and the contacts 15 closed. Consequently, not only the heater 5 on the thermostat 4 but also the heater 14 on the device 13 will be energized. On the bridging of the contacts 13' by the expanding mercury, the winding 16 will be short-circuited and the contacts 15 opened, deenergizing both of the heaters 4 and 14. The mercury in 13 will contract and the relay winding will be re-energized and a cycling action thus set up in the regulator, whereby a constant wattage is supplied to the heater 5. Thus a constant bias heat will be applied by the heater 5 to the thermostat 4, giving it a certain effective temperature setting.

When heaters 1 are switched on, however, the extra energy supplied by the heater 17 will reduce the effective setting of the thermostat 13. Consequently, the contents 13' will be closed and the relay contacts open for a greater proportion of the cycling time, so that a reduced constant wattage will be passed to the heater 5 in well-known manner. As with the other examples, the effective setting of the thermostat 4 will be raised and with the same effect.

In some cases, in conjunction with arrangements such as have been described above, provision may be advantageously made for automatically cutting off the compartment heating if the temperature of the return air is well above the controlled region of temperature required in the vehicle. When the vehicle is too hot and the general requirement of the vehicle is for cooling, the controlled region of temperature can be reached more quickly if the cooling is not offset by a certain amount of compartment heating. A thermostat is, therefore, provided to cut-off all the compartment heating, by means of a relay and contactor, if the vehicle reaches a predetermined level of temperature a few degrees above the controlled range of the compartments.

Alternatively the said contactor may be arranged to open when all or a predetermined proportion of the compartment heaters are switched on. The former alternative may be achieved by connecting the contactor winding in series with auxiliary contacts which are closed when respective compartment-heater switches are closed, so that the contactor will be energised and open when all of the said switches are closed. For the second alternative, a relay controlling the contactor may be arranged to be energised through a number of sampling resistances which can be connected in parallel with each other and in series with the relay winding by auxiliary contacts on the compartment-heater switches, the relay being arranged to close and cause the contactor to open when a predetermined proportion of the heaters are switched on.

What is claimed is:

1. A heating system for a compartmental vehicle comprising a common equipment connected to the compartments of the vehicle for supplying air thereto, the said equipment including means for changing the temperature of the said air, a common air return between the said compartments and the said equipment, individual electrical heaters for respective compartments, a current-supply circuit for the said heaters, separately controllable switches for connecting respective compartment heaters to the said circuit and an arrangement for controlling the temperature in the said compartments comprising in combination with a main thermostat arranged to be influenced by the temperature of the air in the said common return and operatively connected to the said equipment for controlling the temperature-changing action thereof, so that the temperature is increased on a decrease of temperature of the air in the said common return below a predetermined temperature setting of the said main thermostat, and current-responsive means connected to the said circuit and operatively associated with the said main thermostat for automatically controlling its effective setting, the said setting being raised in dependence upon the current in the said circuit when the said heaters are energised upon closure of the said switches.

2. A system in accordance with claim 1, wherein the main thermostat is of the heater-bias type and means is provided for varying the bias in dependence upon the current in the said heater-supply circuit.

3. A system in accordance with claim 1, wherein the said main thermostat has an electrical-bias heater and voltage-controlling means is provided in the supply circuit for the said bias heater, the bias being thereby varied by varying the voltage with which the current for the said bias heater is supplied.

4. A system in accordance with claim 3, the current for the circuits of the heaters being alternating current, the said voltage-controlling means comprising a transformer having its primary winding connected in the said supply circuit for the compartment heaters and its secondary in the said supply circuit for the bias heater.

5. A system according to claim 3, the current for the circuits of the heaters being direct current, the said voltage-controlling means comprising an electromagnetic voltage regulator having a series winding operatively connected to the said supply circuit for the compartment heaters.

6. A system according to claim 2, wherein the said bias-varying means comprises a wattage regulator comprising a thermometric device provided with a bias heater operatively connected to the said supply circuit for the compartment heaters.

7. A system according to claim 1 and comprising also means for switching off the compartment heaters automatically if the temperature of the air in the common air return exceeds a predetermined value.

References Cited in the file of this patent

UNITED STATES PATENTS

| | | |
|---|---|---|
| 2,271,120 | Grant | Jan. 27, 1942 |
| 2,510,039 | Rudahl | May 30, 1950 |
| 2,516,666 | Appelgate | July 25, 1950 |
| 2,660,407 | Lehane | Nov. 24, 1953 |